(12) United States Patent
Suh et al.

(10) Patent No.: US 7,215,622 B2
(45) Date of Patent: May 8, 2007

(54) METHOD AND APPARATUS OF DETERMINING A RECORDING LOCATION ON A HIGH-DENSITY RECORDING MEDIUM

(75) Inventors: Sang Woon Suh, Seoul (KR); Jin Yong Kim, Kyunggi-do (KR); Ik Beom Jeon, Seoul (KR)

(73) Assignee: LG Electronics, Inc., Seoul (KR)

(*) Notice: Subject to any disclaimer, the term of this patent is extended or adjusted under 35 U.S.C. 154(b) by 367 days.

(21) Appl. No.: 10/503,988

(22) PCT Filed: Dec. 11, 2003

(86) PCT No.: PCT/KR03/02709

§ 371 (c)(1),
(2), (4) Date: Oct. 25, 2004

(87) PCT Pub. No.: WO2004/053853

PCT Pub. Date: Jun. 24, 2004

(65) Prior Publication Data

US 2005/0105320 A1    May 19, 2005

(30) Foreign Application Priority Data

Dec. 11, 2002    (KR)    ........................ 10-2002-0078890

(51) Int. Cl.
*G11B 11/03* (2006.01)

(52) U.S. Cl. ............................. 369/53.24; 369/53.41; 369/124.07

(58) Field of Classification Search ................... None
See application file for complete search history.

(56) References Cited

U.S. PATENT DOCUMENTS 6,256,282 B1 * 7/2001 Yamagami et al. ......... 369/111
7,102,974 B2 * 9/2006 Tsukihashi et al. ...... 369/53.24

FOREIGN PATENT DOCUMENTS

| EA | 1 022 735 A2 | 7/2000 |
|---|---|---|
| JP | 09-128907 A | 5/1997 |
| JP | 11-296996 A | 10/1999 |
| JP | 12-137952 A | 5/2000 |
| JP | 13-93146 A | 4/2001 |

* cited by examiner

*Primary Examiner*—Paul W. Huber
(74) *Attorney, Agent, or Firm*—Birch Stewart Kolasch & Birch, LLP

(57) ABSTRACT

The present invention relates to method and apparatus of determining a recording location of a high-density recording medium. The present method determines a targeted recording location on a high-density rewritable or read-only recording medium based on successively-detected frame syncs or their combination that includes at least one frame sync written after the targeted recording location.

13 Claims, 10 Drawing Sheets

Run-Out

*Guard 2 Pattern = 01001001010100001000(20cb) X 27 repetitions*

Run-In

*Guard 1 Pattern = 01001001010100001000(20cb) X 55 repetitions*

METHOD AND APPARATUS OF DETERMINING A RECORDING LOCATION ON A HIGH-DENSITY RECORDING MEDIUM

This application is a 371 of PCT/KR03/02709, filed Dec. 11, 2003.

1. TECHNICAL FIELD

The present invention relates to a method and apparatus of determining a recording location on a high-density recording medium such as a Blu-ray Disk Rewritable (BD-RE) disk or a Blu-ray Disk ROM (BD-ROM) disk.

2. BACKGROUND ART

Figure 1:
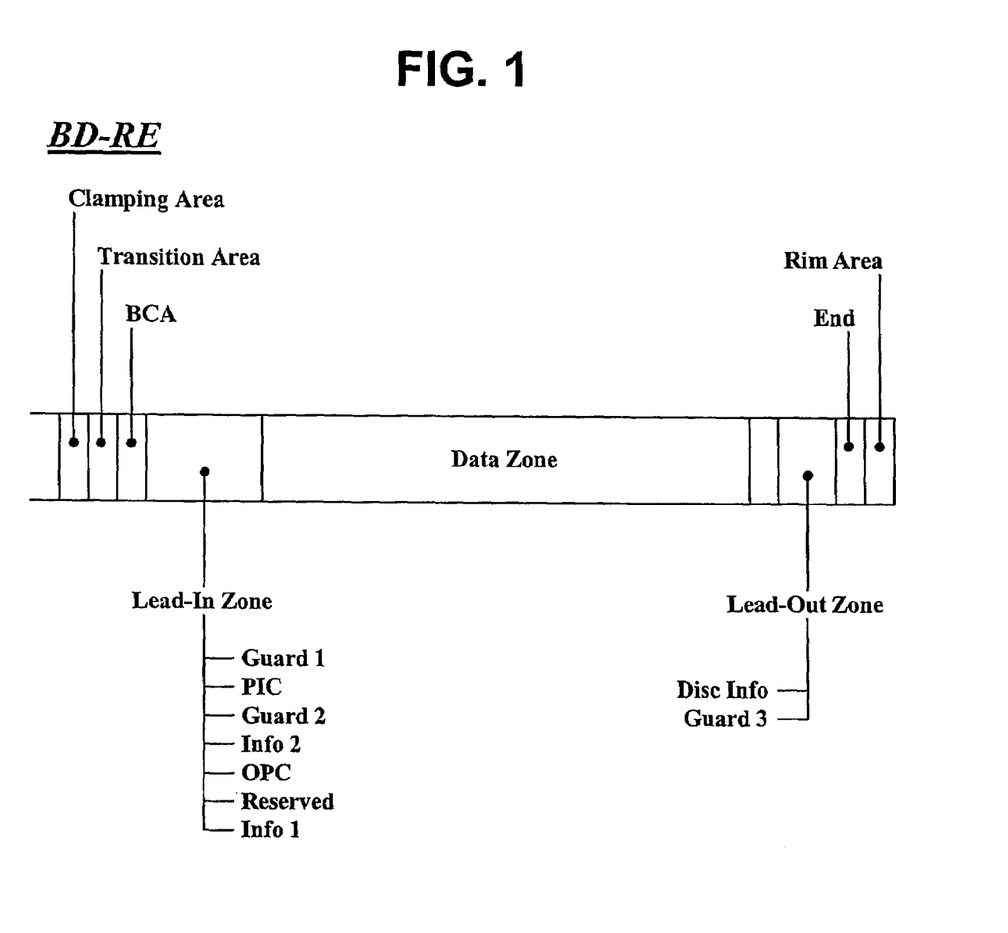
FIG. 1 illustrates the structure of a BD-RE disk.

The standardization of new high-density read only and rewritable optical disks capable of recording large amounts of high-quality video and audio data has been progressing rapidly. The Blu-ray Disc Rewritable (BD-RE) is one example of these new optical disks. As shown in FIG. 1, a BD-RE disk comprises a clamping area, a transition area, a burst cutting area (BCA), a lead-in zone, a data zone, and a lead-out zone.

Figure 2:
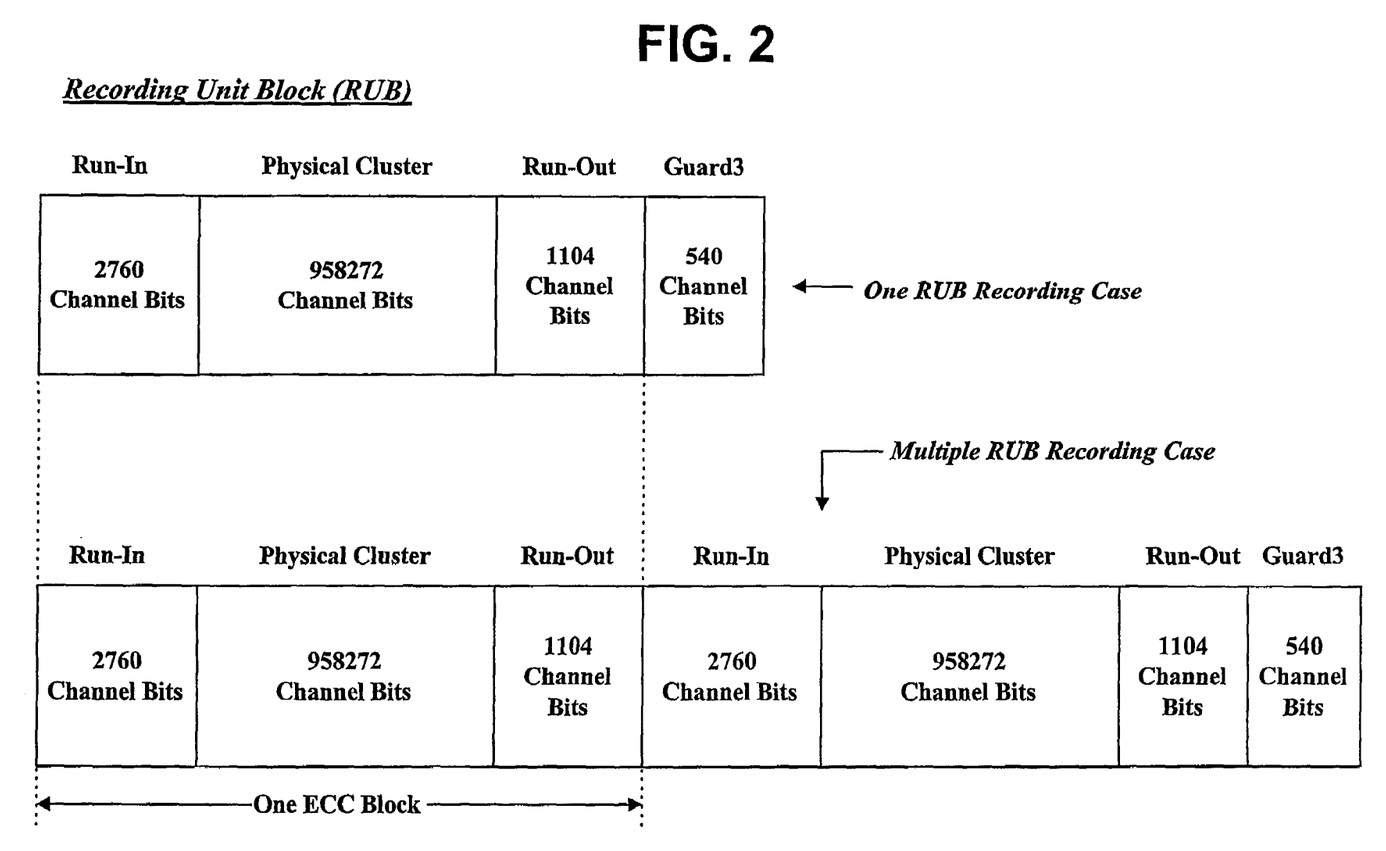
FIG. 2 illustrates the structure of recording unit blocks of the BD-RE.

As shown in FIG. 2, data recorded on the BD-RE disk is organized into a plurality of recording unit blocks (RUBs) each of which corresponds to an ECC block.

In the case where data is recorded as only one RUB, the RUB comprises a run-in area of 2760 channel bits, a physical cluster of 958272 channel bits, and a run-out area of 1104 channel bits. The RUB is followed by a guard 3 area of 540 channel bits.

On the other hand, if data is recorded as a plurality of RUBs with time continuity, one guard 3 area of 540 channel bits is placed after the plurality of RUBs in order to prevent the recorded RUBs from being overwritten by data to be recorded next.

Figure 3:
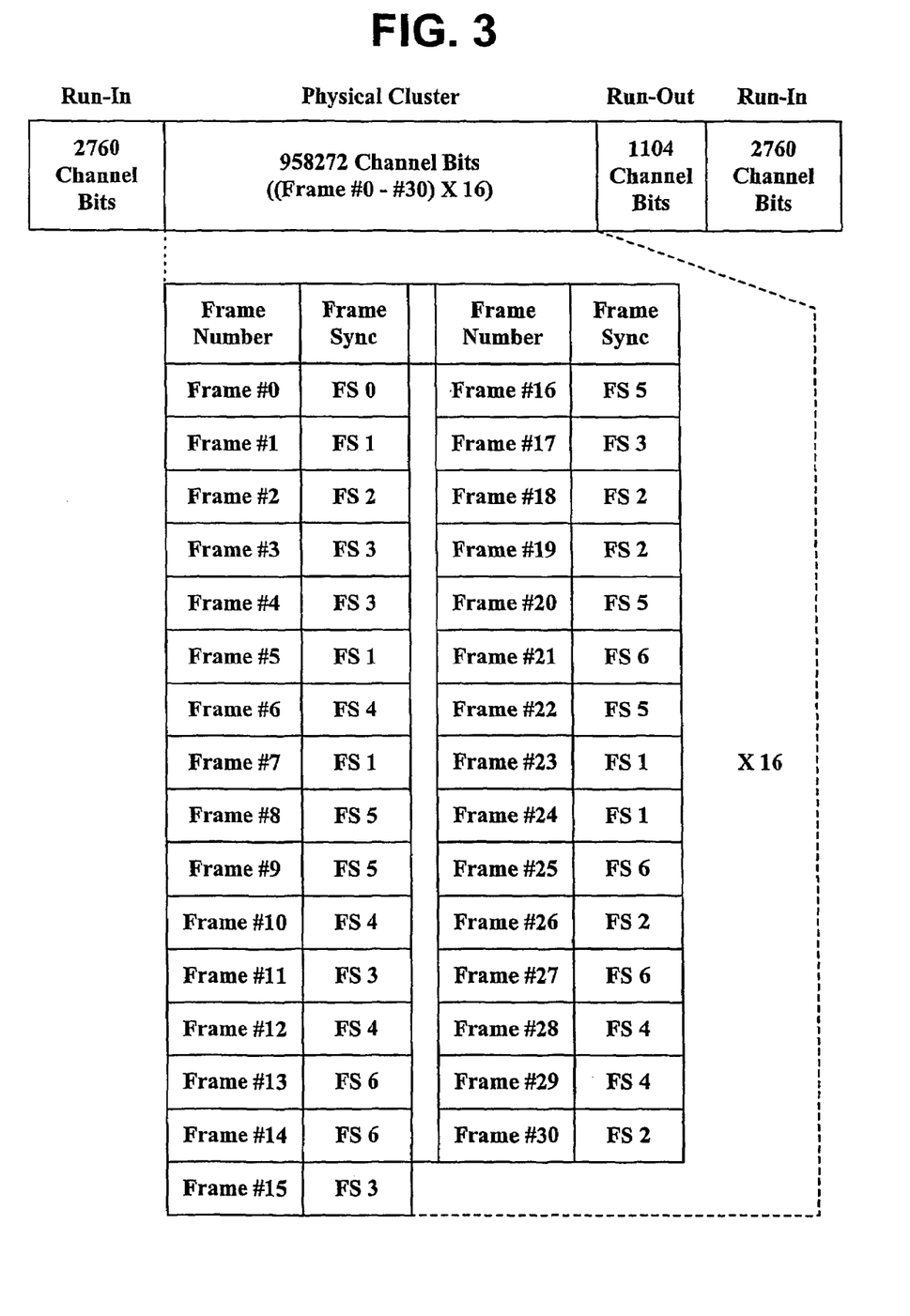
FIG. 3 illustrates recording frames and frame syncs included in a physical cluster of the BD-RE.

As shown in FIG. 3, 31 recording frames (Frame #0~Frame #30) are sequentially recorded in the physical cluster area and the group of 31 recording frames is recorded repeatedly 16 times. The 31 recording frames (Frame #0~Frame #30) are associated with 7 different frame syncs (Frame Sync #0~Frame Sync #6) in a predefined order.

Figure 4:
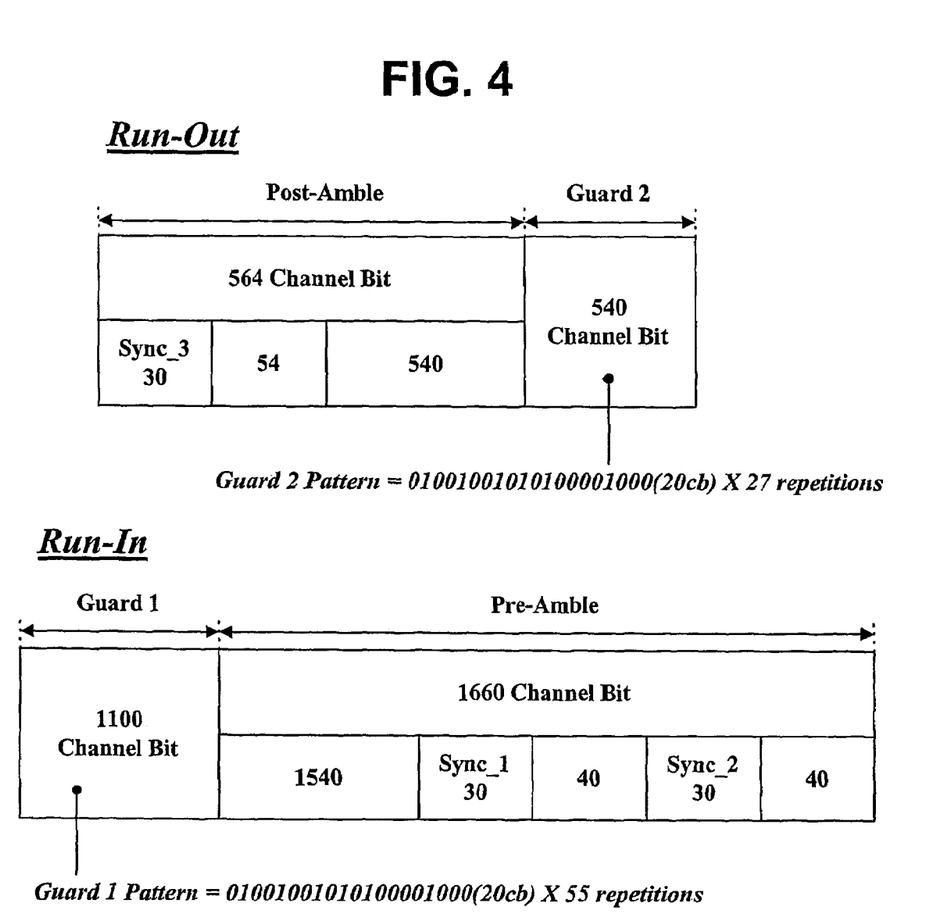
FIG. 4 illustrates the run-in and run-out areas of the BD-RE.

As shown in FIG. 4, the run-out area comprises a post-amble of 564 channel bits and a guard 2 area of 540 channel bits. In the guard 2 area, a pattern of 20 channel bits is recorded 27 times repeatedly in order that the end of the RUB may be detected. The post-amble includes a sync of 30 channel bits (Sync 3).

As shown, the run-in area comprises a guard 1 area of 1100 channel bits and a pre-amble of 1660 channel bits. In the guard 1 area, a pattern of 20 channel bits is recorded 55 times repeatedly in order that the beginning of the RUB may be detected. The pre-amble includes two syncs (Sync 1 and Sync 2) each having 30 channel bits.

Figure 5:
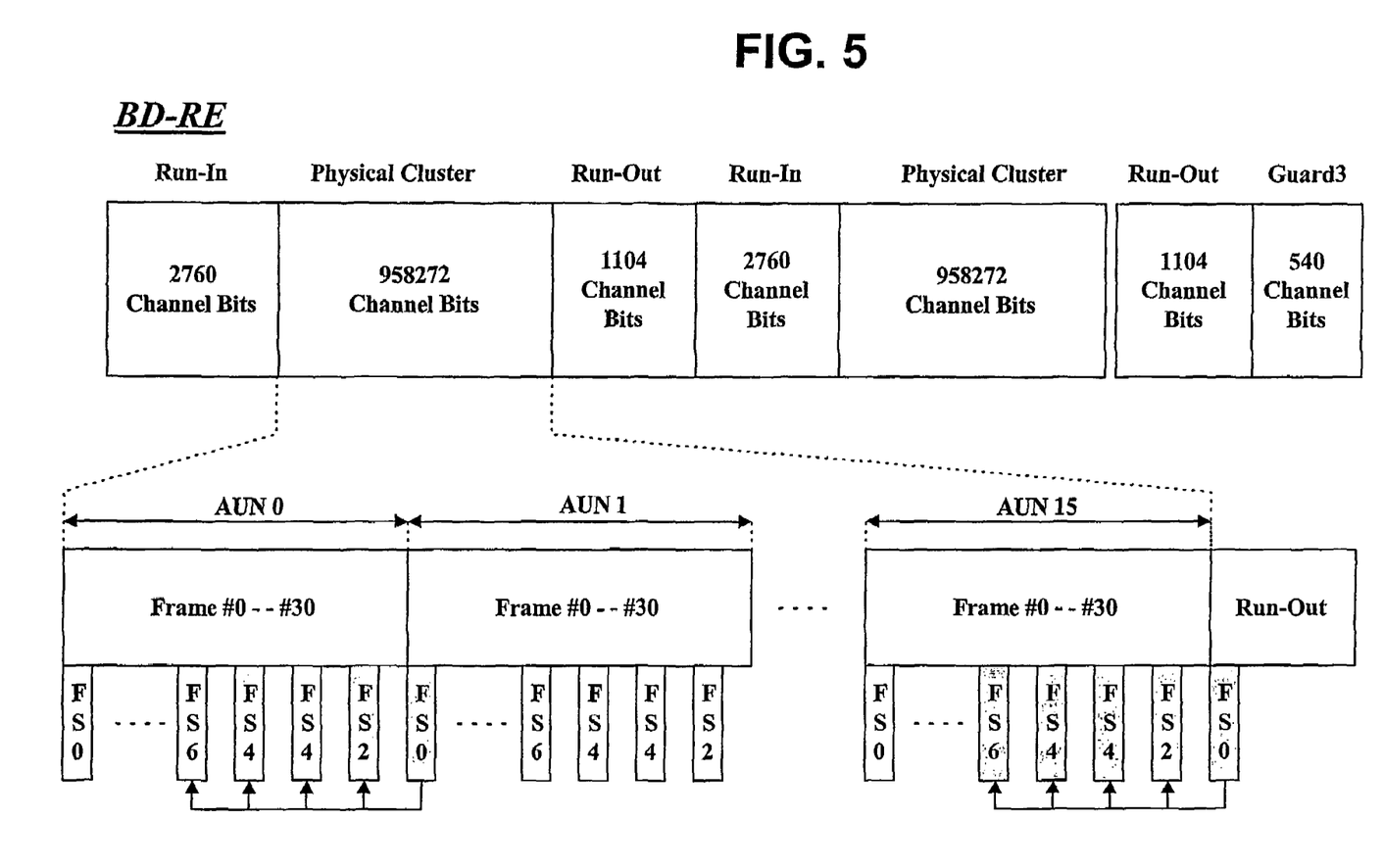
FIG. 5 illustrates an embodiment of determining a recording location on a BD-RE disk.

As shown in FIG. 5, the physical cluster of the BD-RE includes physical address information for random access to the RUB, i.e., 16 address unit numbers (AUN 0~AUN 15). The address information is modulated and encoded together with A/V data and recorded in the physical cluster in a distributive manner.

As described with reference to FIG. 3, 31 frames (Frame #0~Frame #30) of each address unit number (AUN) are assigned 7 frame syncs in a predetermined order. The recording frame number of a targeted recording location can be identified by a combination of the frame sync detected at the targeted recording location and 4 successive frame syncs detected just before the targeted recording location as shown in FIG. 5.

For example, if the frame sync 'FS 0' included in Frame #0 of AUN 1 is detected after 'FS 6', 'FS 4', 'FS 4', and 'FS 2' included in Frame #27, Frame #28, Frame #29, and Frame #30 of AUN 0 are detected successively, the current recording location (i.e., the targeted recording location) is identified as Frame #0 based on the information.

In the BD-RE, 'FS 0' is also recorded in Sync 3 of the run-out area as shown in FIG. 5. Therefore, if Frames #27~#30 of the last AUN (AUN 15) corresponding 'FS 6', 'FS 4', 'FS 4', and 'FS 2' respectively are detected and then 'FS 0' of Sync 3 is detected, the recording location at which 'FS 0' is detected may be misidentified as the first recording frame (Frame #0) of the physical cluster. An effective method for solving this problem is not yet available.

The standardization for high-density read-only optical disks such as the Blu-ray ROM (BD-ROM) is under way. A recording format that enables determination of recording locations on the BD-ROM needs to be defined. If the recording format of the BD-RE is applied to the BD-ROM, the aforementioned problem of incorrect identification of recording locations remains unsolved. Therefore, an effective method of correctly determining a recording location on a BD-ROM disk as well as a BD-RE disk needs to be developed.

3. DISCLOSURE OF INVENTION

In view of the shortcomings of the prior art, it is an object of the present invention to provide a method and apparatus of determining a recording location on a high-density recording medium that determines a targeted recording location on a high-density rewritable or read-only recording medium based on successively-detected frame syncs or their combination including at least one frame sync written after the targeted recording location.

The method of determining a recording location on a igh-density recording medium in accordance with the resent invention determines a targeted recording location on a high-density rewritable or read-only recording medium based on successively-detected frame syncs or their combination that includes at least one frame sync written after the targeted recording location.

The method of determining a recording location on a high-density recording medium in accordance with the present invention comprises determining the type of the recording medium inserted into an apparatus, detecting successive frame syncs from the high-density recording medium, and determining a recording location by comparing a combination of the successively detected frame syncs with frame sync recording pattern information corresponding to the determined type of the recording medium.

The apparatus of determining a recording location on a high-density recording medium in accordance with the present invention comprises memory means for separately storing unique recording pattern information about frame syncs corresponding to the Blu-ray disk rewritable (BD-RE) and unique recording pattern information about frame syncs corresponding to the Blu-ray disk ROM (BD-RE) and determination means for determining a targeted recording location of a recording medium inserted into the apparatus by selecting one type of the recording pattern information stored in the memory means depending on the type of the recording medium and comparing a combination of frame syncs detected successively from the recording medium with the selected recording pattern information.

5. MODES FOR CARRYING OUT THE INVENTION

In order that the invention may be fully understood, preferred embodiments thereof will now be described with reference to the accompanying drawings.

The method and apparatus of determining a recording location on a high-density recording medium in accordance with the present invention determines a targeted recording location on a BD-RE disk based on successive frame syncs detected before and after the targeted recording location and at the targeted recording location.

Figure 6:
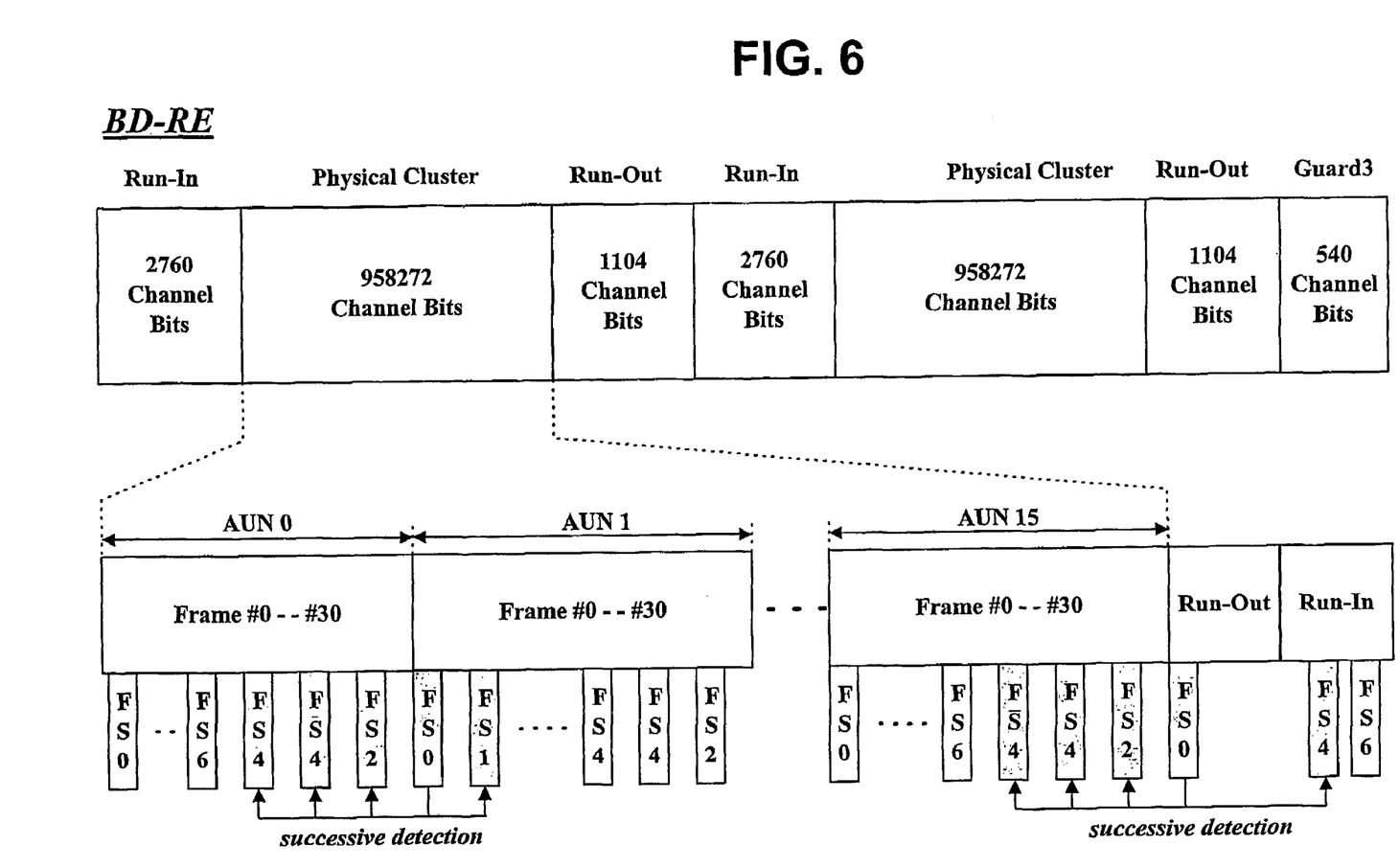
FIG. 6 illustrates an embodiment of determining a recording location on a BD-RE disk in accordance with the present invention.

As shown in FIG. 6, for example, if the frame sync 'FS 0' included in Frame #0 of AUN 1 is detected after 'FS 4', 'FS 4', and 'FS 2' included in Frame #28, Frame #29, and Frame #30 of AUN 0 are detected successively, and the frame sync 'FS 1' included in Frame #1 of AUN 1 is detected, the recording location at which 'FS 0' is detected is identified as Frame #0 based on the information.

In this case, though 'FS 0' is recorded in Sync 3 of the run-out area as shown in FIG. 6, the run-out area can be correctly identified. If frame syncs 'FS 4', 'FS 4', and 'FS 2' included in Frame #28, Frame #29, and Frame #30 of AUN 15 are detected successively and then 'FS 0' recorded in Sync 3 of the run-out area is detected, the run-in area following the run-out area includes 'FS 4' and thus the recording location at which 'FS 0' is detected is correctly identified as the run-out area based on the frame syncs detected in the order of 'FS 4', 'FS 4', 'FS 2', 'FS 0', and 'FS 4'.

Figure 7:
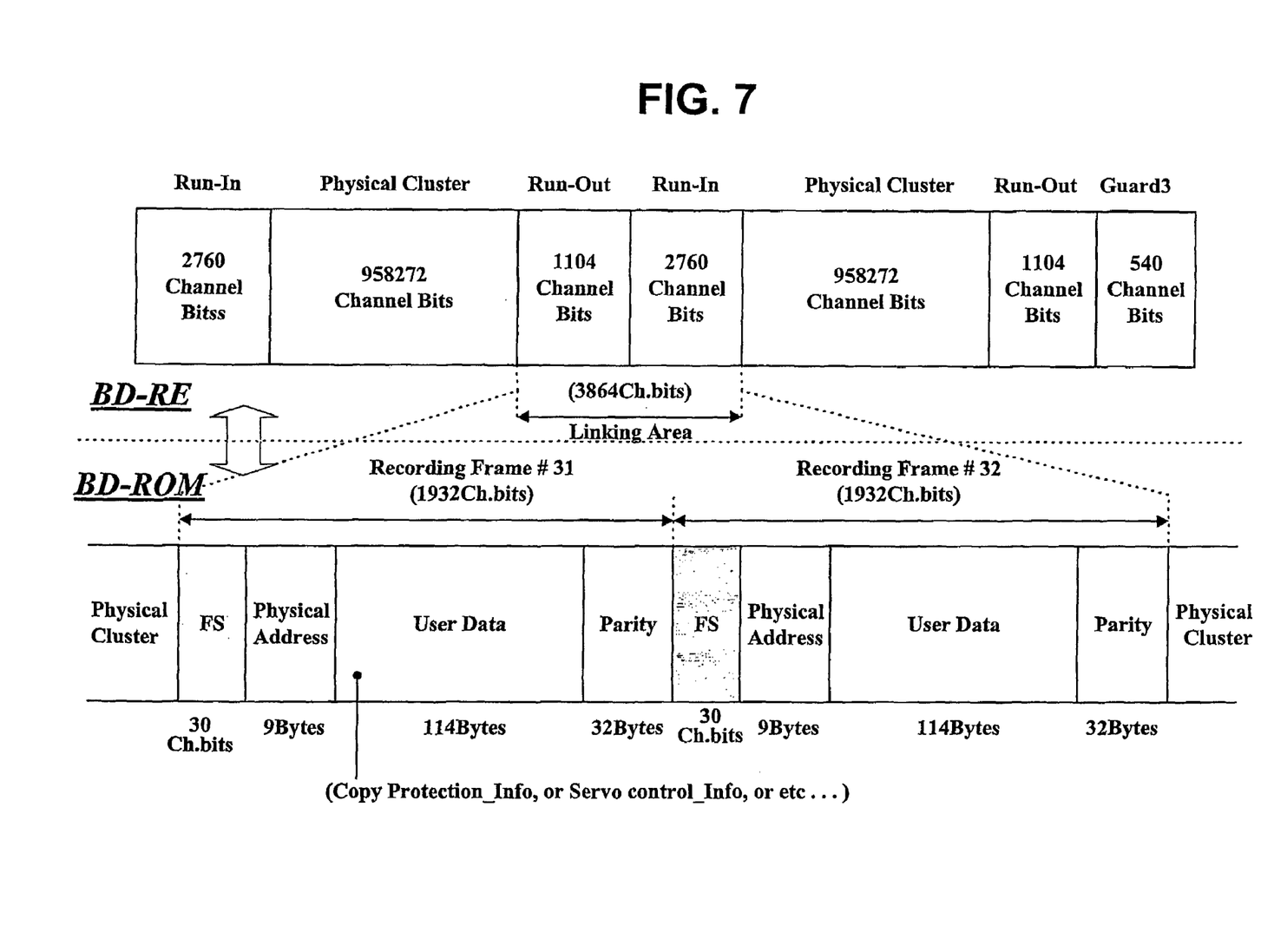
FIG. 7 illustrates the structure of data recorded in the linking area of the BD-ROM in accordance with the present invention.

The method and apparatus of determining a recording location on a high-density recording medium in accordance with the present invention is applicable to the BD-ROM. As shown in FIG. 7, in this case, the run-out area and run-in area of the BD-RE are defined as a single linking area in which two recording frames (Frame #31 and Frame #32) are recorded.

Each of the recording frames in the linking area is of 1932 channel bits and comprises a frame sync of 30 channel bits, physical address information of 9 bytes, user data of 114 bytes, and a parity of 32 bytes. The size of the two recording frames amounts to 3864 channel bits, which equals the sum of the sizes of the run-in area and the run-out area of the BD-RE.

The user data of 114 bytes included in each of the recording frames contains various types of information such as copy protection information for preventing an illegal copying of the contents or navigation information for servo control.

The two frame syncs included in the linking area may be one of the seven frame syncs ('FS 0'~'FS 6') recorded in the physical cluster or a frame sync other than the seven frame syncs.

Figure 8:
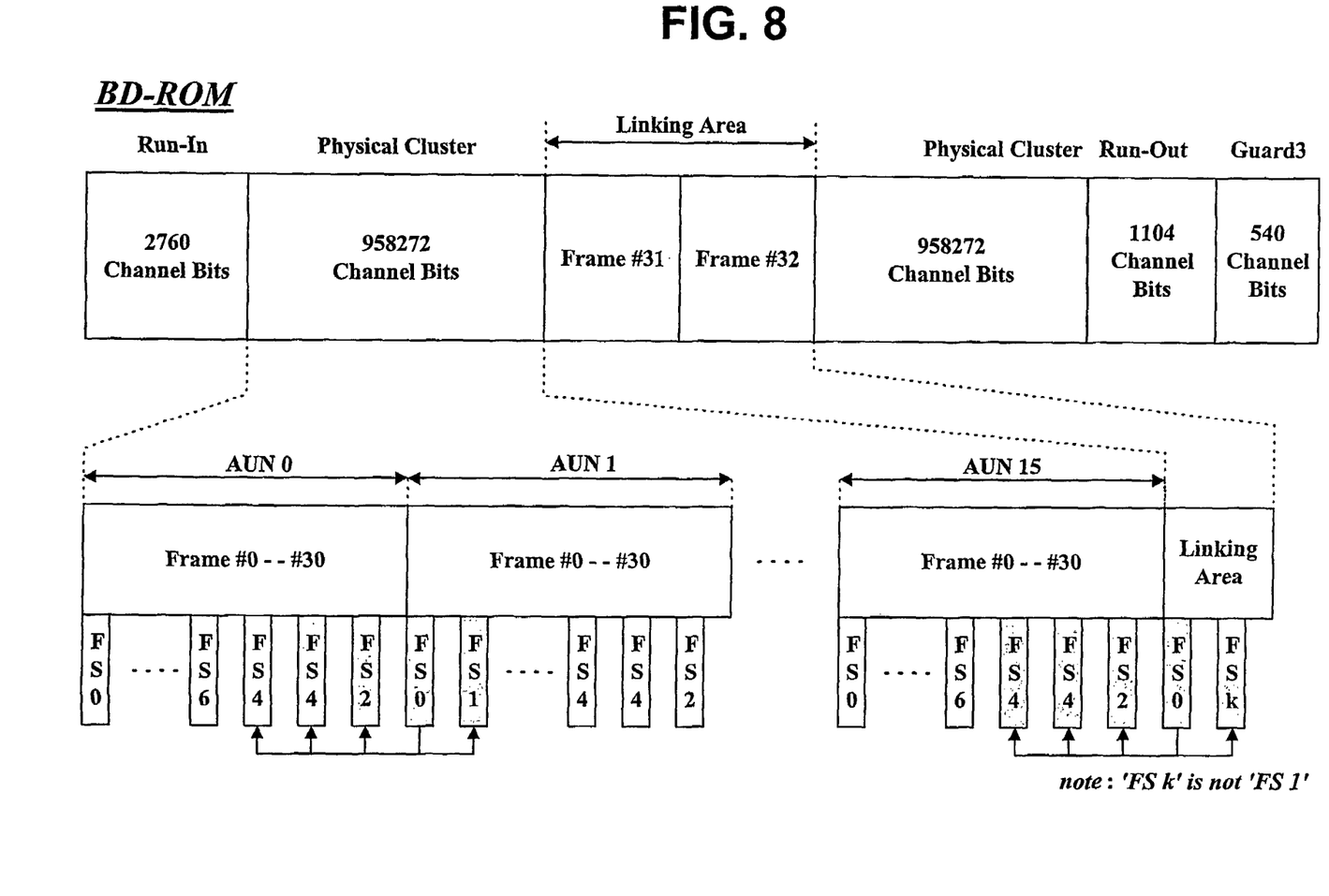
FIG. 8 illustrates an embodiment of determining a recording location on a BD-ROM disk in accordance with the present invention.

For example, if 'FS 0' is recorded in the first recording frame (Frame #31) of the linking area as shown in FIG. 8, a targeted recording location is determined based on a combination of successive frame syncs detected before and after the targeted recording location and at the targeted recording location as was described with reference to FIG. 6.

If the frame sync 'FS 0' included in Frame #0 of AUN 1 is detected after 'FS 4', 'FS 4', and 'FS 2' included in Frame #28, Frame #29, and Frame #30 of AUN 0 are detected successively, and then the frame sync 'FS 1' included in Frame #1 of AUN 1 is detected, the recording location at which 'FS 0' is detected is identified as Frame #0 based on the frame syncs detected in the order of 'FS 4', 'FS 4', 'FS 2', 'FS 0', and 'FS 1'.

In this case, though 'FS 0' is recorded in the first recording frame of the linking area as shown in FIG. 8, the first recording frame of the linking area can be identified correctly. If frame syncs 'FS 4', 'FS 4', and 'FS 2' included in Frame #28, Frame #29, and Frame #30 of AUN 15 are detected successively and then 'FS 0' recorded in the first recording frame of the linking area is detected, the second recording frame of the linking area includes 'FS k' and thus the recording location at which 'FS 0' is detected is correctly identified as the first recording frame of the linking area (Frame #31) based on the frame syncs detected in the order of 'FS 4', 'FS 4', 'FS 2', 'FS 0', and 'FS k' where 'FS k' is not 'FS 1'.

For the aforementioned method to work properly, the frame sync of the second recording frame of the linking area ('FS k') should not be 'FS 1'. If 'FS k' happens to be 'FS 1', the recording location at which 'FS 0' is detected in the previous example may be incorrectly identified as the first recording frame of the second AUN (AUN 1) because the two cases cannot be distinguished as shown in FIG. 8.

Figure 9:
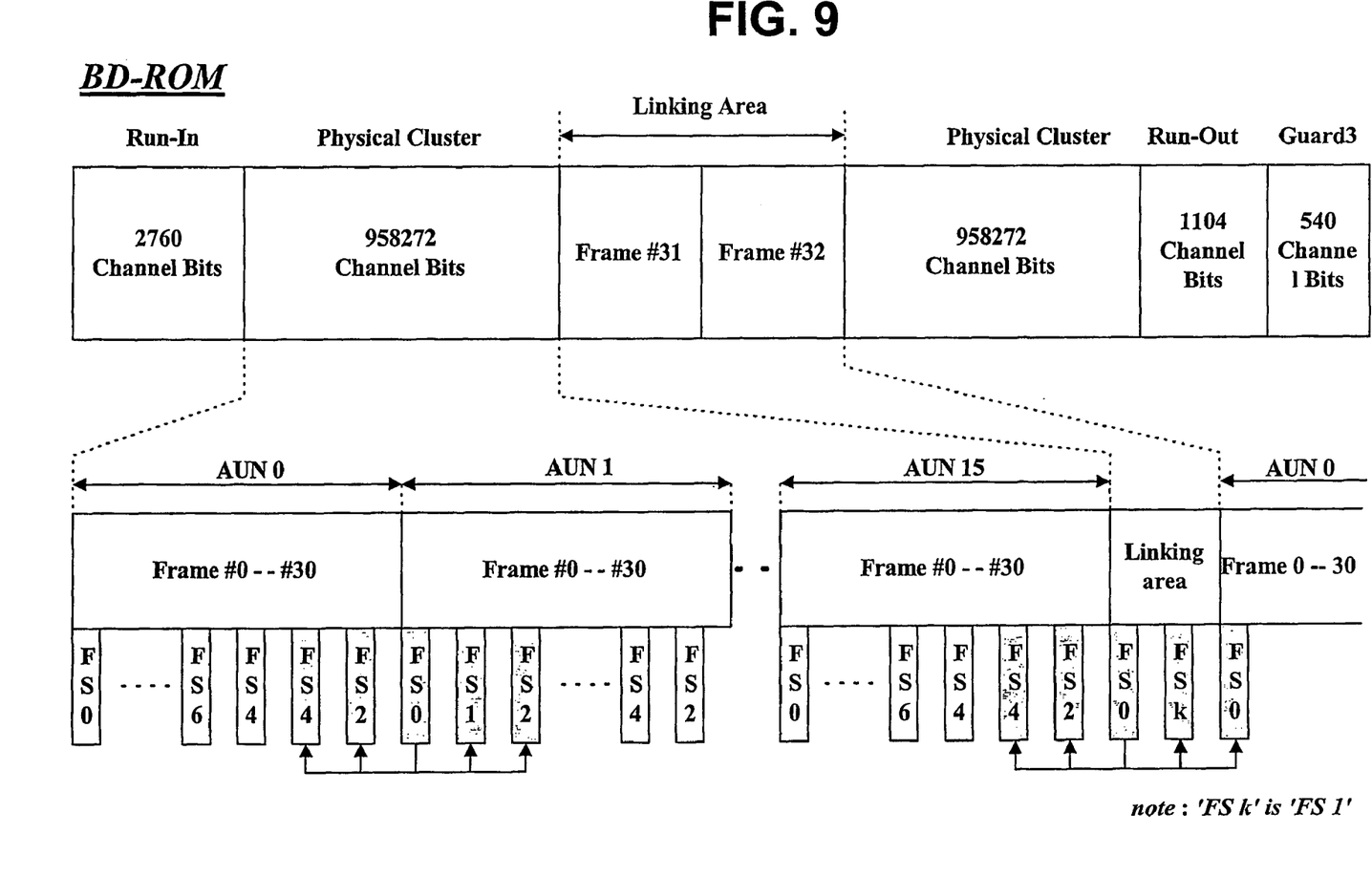
FIG. 9 illustrates another embodiment of determining a recording location on a BD-ROM disk in accordance with the present invention.

In view of the problem, the frame sync of the second recording frame of the linking area may be confined to a frame sync other than 'FS 1' or alternatively, a targeted recording location can be determined based on a combination of frame syncs detected before the targeted recording location and at the targeted recording location and more than two frame syncs detected after the targeted recording location as shown in FIG. 9.

As shown in FIG. 9, if the frame sync 'FS 0' included in Frame #0 of AUN 1 is detected after 'FS 4', and 'FS 2' included in Frame #29 and Frame #30 of AUN 0 are detected successively, and then the frame sync 'FS 1' and 'FS 2' included in Frame #1 and Frame #2 of AUN 1 are detected successively, then the recording location at which 'FS 0' is detected is identified as Frame #0 based on the frame syncs detected in the order of 'FS 4', 'FS 2', 'FS 0', 'FS 1', and 'FS 2'.

In this case, though 'FS 0' and 'FS 1' are recorded in the first recording frame and the second recording frame of the linking area, respectively, the first recording frame of the linking area in which 'FS 0' is recorded can be identified correctly. If frame syncs 'FS 4' and 'FS 2' included in Frame #29 and Frame #30 of AUN 15 are detected successively and then 'FS 0' and 'FS 1' recorded in the linking area are detected successively, the first recording frame (Frame #0) after the linking area includes 'FS 0' and thus the recording frame at which 'FS 0' is detected is correctly identified as the first recording frame of the linking area (Frame #31) based on the frame syncs detected in the order of 'FS 4', 'FS 2', 'FS 0', 'FS 1', and 'FS 0'.

Figure 10:
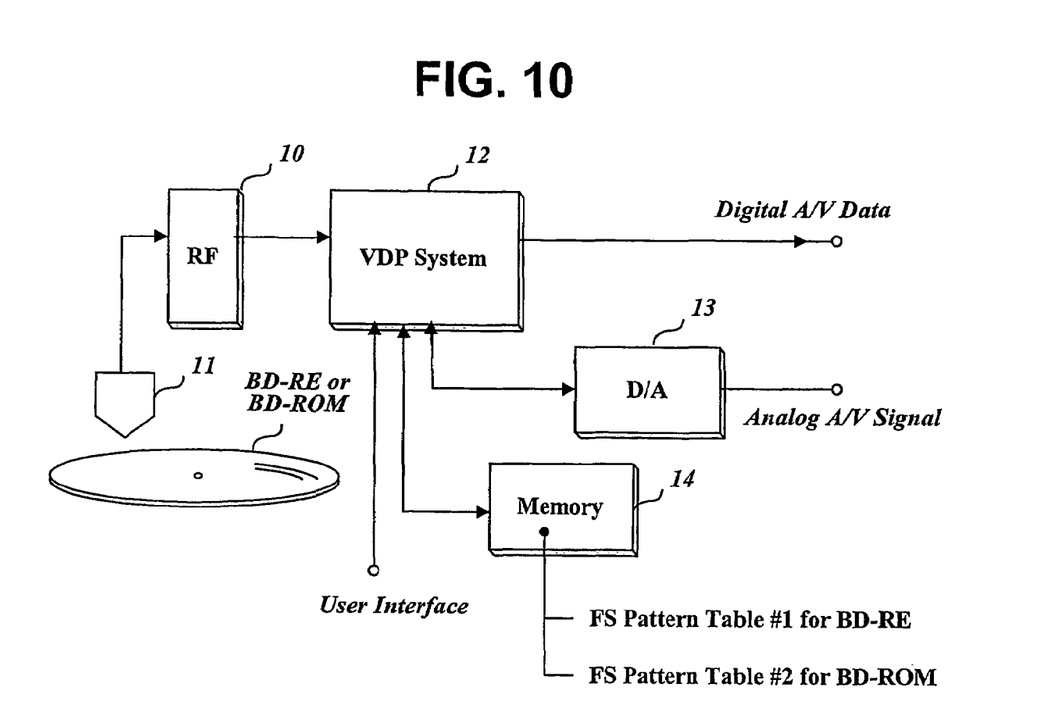
FIG. 10 illustrates a schematic diagram of an optical disk reproducing apparatus embodying the present invention.

FIG. 10 illustrates a schematic diagram of an optical disk reproducing apparatus embodying the present invention. The apparatus comprises an optical pickup 11 for reading optical information recorded on an optical recording medium such as a BD-ROM disk, an RF unit 10 for converting the signal reproduced by the optical pickup 11 into a binary signal, a VDP (video disc play) system 12 for demodulating the binary signal and for controlling a servo system of the apparatus, a D/A converter 13 for converting the output of the VDP system into an analog signal, and a memory 14. If the BD-ROM disk is inserted into the apparatus and the signal recorded in the linking area is detected by the VDP system 12 via the optical pickup 11 and the RF unit 12, the VDP system 12 identifies a targeted recording location based on two frame syncs detected before the targeted recording location, a frame sync detected at the targeted recording location, and two frame syncs detected after the targeted recording location.

The memory 14 stores patterns of frame syncs recorded on the BD-RE as FS pattern table #1 as described above with reference to FIG. 6 and stores patterns of frame syncs recorded on the BD-ROM as FS pattern table #2 as described above with reference to FIGS. 8 and 9.

Reading navigation information such as disc type information recorded in the lead-in zone of the optical disk, the VDP system 12 determines whether the optical disk is a BD-RE disk or a BD-ROM disk and performs servo operations depending on the detected disk type.

Selecting a table from the two FS pattern tables depending on the detected disk type, the VDP system 12 performs operations to determine a recording location by comparing syncs detected from the disk and sync pattern stored in the memory 14.

The method and apparatus of determining a recording location on a high-density recording medium prevents an incorrect identification of a targeted recording location on a BD-RE or BD-ROM disk.

While the invention has been disclosed with respect to a limited number of embodiments, those skilled in the art, having the benefit of this disclosure, will appreciate numerous modifications and variations therefrom. It is intended that all such modifications and variations fall within the spirit and scope of the invention.

The invention claimed is:

1. A method of determining a recording location on a high-density recording medium, wherein a targeted recording location on the high-density recording medium is determined based on a combination of frame syncs detected successively from the high-density recording medium including at least one frame sync written after the targeted recording location.

2. The method set forth in claim 1, wherein the targeted recording location is determined based on a combination of a frame sync detected at the targeted recording location, three frame syncs detected before the targeted recording location, and one frame sync detected after the targeted recording location.

3. The method set forth in claim 2, wherein the high-density recording medium is a Blu-ray disk rewritable (BD-RE) disk.

4. The method set forth in claim 2, wherein the high-density recording medium is a Blu-ray disk ROM (BD-ROM) disk in which two recording frames are recorded in a recording area corresponding to the run-out area and run-in area of the Blu-ray disk rewritable (BD-RE) disk and frame syncs other than a first frame sync (FS 0) and a second frame sync (FS 1) are recorded in the two recording frames.

5. The method set forth in claim 1, wherein the targeted recording location on the high-density recording medium is determined based on a combination of a frame sync detected at the targeted recording location, two frame syncs detected before the targeted recording location, and two frame syncs detected after the targeted recording location.

6. The method set forth in claim 5, wherein the high-density recording medium is a Blu-ray disk ROM (BD-ROM) disk in which two recording frames are recorded in a recording area corresponding to the run-out area and run-in area of the Blu-ray disk rewritable (BD-RE).

7. The method set forth in claim 1, wherein the recording frame number of the targeted recording location is identified or the targeted recording location is identified as the run-out area of a Blu-ray disk rewritable (BD-RE) disk based on at least one frame sync written after the targeted recording location.

8. The method set forth in claim 1, wherein the recording frame number of the targeted recording location is identified or the targeted recording location is identified as a pre-defined recording area of a Blu-ray disk ROM (BD-ROM) disk corresponding to the run-out area and the run-in area of the Blu-ray disk rewritable (BD-RE) disk based on at least one frame sync written after the targeted recording location.

9. An apparatus of determining a recording location on a high-density recording medium, comprising:
  memory means for separately storing unique recording pattern information about frame syncs corresponding to the Blu-ray disk rewritable (BD-RE) and unique recording pattern information about frame syncs corresponding to the Blu-ray disk ROM (BD-RE); and
  determination means for determining a targeted recording location of a recording medium inserted into the apparatus by selecting one type of the recording pattern information stored in the memory means depending on the type of the recording medium and comparing a combination of frame syncs detected successively from the recording medium with the selected recording pattern information.

10. The apparatus set forth in claim 9, wherein the determination means determines whether the recording medium is a Blu-ray disk rewritable (BD-RE) disk or a Blu-ray disk ROM (BD-ROM) disk based on disc type information written in the recording medium and selects one type of the recording pattern information corresponding to the determined type of the recording medium.

11. The apparatus set forth in claim 9 identifies the recording frame number of the targeted recording location or identifies the targeted recording location as the run-out area of a Blu-ray disk rewritable (BD-RE) based on at least one frame sync written after the targeted recording location.

12. The apparatus set forth in claim 9 identifies the recording frame number of the targeted recording location or identifies the targeted recording location as a predefined recording area of a Blu-ray disk ROM (BD-ROM) disk corresponding to the run-out area and the run-in area of the Blu-ray disk rewritable (BD-RE) disk.

13. A method of determining a recording location on a high-density recording medium, comprising the steps of:

determining the type of the recording medium inserted into an apparatus;

detecting successive frame syncs from the high-density recording medium; and determining a recording location by comparing a combination of the successively detected frame syncs with frame sync recording pattern information corresponding to the determined type of the recording medium.

* * * * *